United States Patent
Cho et al.

(10) Patent No.: US 6,613,476 B2
(45) Date of Patent: Sep. 2, 2003

(54) POSITIVE ACTIVE MATERIAL FOR RECHARGEABLE LITHIUM BATTERY AND METHOD OF PREPARING SAME

(75) Inventors: Jae-Phil Cho, Cheonan (KR); Do-Young Seung, Seoul (KR); Geun-Bae Kim, Suwon (KR)

(73) Assignee: Samsung SDI Co., Ltd., Suwon (KR)

( * ) Notice: Subject to any disclaimer, the term of this patent is extended or adjusted under 35 U.S.C. 154(b) by 172 days.

(21) Appl. No.: 09/754,100

(22) Filed: Jan. 3, 2001

(65) Prior Publication Data

US 2001/0026892 A1 Oct. 4, 2001

(30) Foreign Application Priority Data

Jan. 3, 2000 (KR) ............................................. 2000-84

(51) Int. Cl.[7] .......................... H01M 4/50; H01M 4/58; H01M 4/88; C01G 45/00
(52) U.S. Cl. ................. 429/224; 429/231.1; 429/231.5; 429/231.6; 429/231.95; 423/49; 252/182.1
(58) Field of Search .......................... 429/231.95, 231.9, 429/224, 231.5, 231.1, 218.1, 252/182.1, 518.1; 423/599, 49, 53

(56) References Cited

U.S. PATENT DOCUMENTS 6,423,294 B2 * 7/2002 Manev et al. ............... 423/599

2002/0048706 A1 * 4/2002 Mayes et al. ............. 429/231.1
2002/0110735 A1 * 8/2002 Farnham et al. ............ 429/199

OTHER PUBLICATIONS

J.R. Dahn et al; Structure and Electrochemistry of Li2CrxMn2–x04 for 1.0 ≤x≤ 1.5'; J. Electrochem Soc., vol. 145, No. 3, Mar. 1998, pp. 851–859.

* cited by examiner

Primary Examiner—Stephen Kalafut
Assistant Examiner—Raymond Alejandro
(74) Attorney, Agent, or Firm—Christie, Parker & Hale, LLP

(57) ABSTRACT

Disclosed is a positive active material of for a rechargeable lithium battery and a method of preparing the same. The positive active material is represented by formula 1:

$$Li_xMn_{2-a-b}Cr_aM_bO_{4+z}$$ [formula 1]

where $x \geq 2$; $0.25 < a < 2$; $0 < b \leq 0.3$; $z \geq 0$; M is an alkali earth metal, a transition metal or a mixture thereof. The method includes the steps of dissolving a chromium salt, a manganese salt, and a metal salt(s) in a solvent to produce a solution; performing a first heat-treatment step on the obtained solution at 400 to 500° C. to produce a chromium manganese metal oxide; mixing the chromium manganese metal oxide with a lithium salt; and performing a second heat-treatment step at 600 to 800° C.

4 Claims, 1 Drawing Sheet

POSITIVE ACTIVE MATERIAL FOR RECHARGEABLE LITHIUM BATTERY AND METHOD OF PREPARING SAME

CROSS-REFERENCE TO RELATED APPLICATION

This application claims priority of Korea patent Application No. 2000-84, filed on Jan. 3, 2000.

BACKGROUND OF THE INVENTION (a) Field of the Invention

The present invention relates to a positive active material for a rechargeable lithium battery and a method of preparing the same. More particularly, the present invention relates to a positive active material for a rechargeable lithium battery and a method of preparing the same in which the positive active material has an excellent capacity retention capability.

(b) Description of the Related Art

For positive and negative active materials, rechargeable lithium batteries use a material from or into which lithium ions are reversibly intercalated or deintercalated. For an electrolyte, an organic solvent or polymer is used. Rechargeable lithium batteries produce electric energy by electrochemical oxidation and reduction which take place during the intercalation and deintercalation of lithium ions.

For the negative electrode active material in a rechargeable lithium battery, metallic lithium was used in the early period of development. However, the lithium negative electrode becomes degraded due to a reaction with the electrolyte. That is, lithium dissolved in an electrolyte as lithium ions upon discharging is deposited as lithium metal on the negative electrode upon charging. When charge/discharge is repeated, lithium is deposited in the form of dendrites which is more reactive toward the electrolyte due to enhanced surface area and may induces a short circuit between the negative and positive active material. This may induce battery explosion. Such problems have been addressed by replacing lithium metal with carbon-based materials such as amorphous carbon and crystalline carbon.

For the positive active material in the rechargeable lithium battery, chalcogenide compounds into or from which lithium ions are intercalated or deintercalated are used. Typical examples include $LiCoO_2$, $LiNiO_2$, $LiNi_{1-x}Co_xO_2$ (0<x<1), $LiMn_2O_4$, or $LiMnO_2$. $LiCoO_2$ is commercially used in small batteries since it has good electrical conductivity and relatively high cell voltage, but it is rather expensive. $LiNiO_2$ is less expensive and has high specific capacity, but it is relatively difficult to prepare in the desired quality level. Manganese-based materials such as $LiMn_2O_4$ or $LiMnO_2$ are the easiest to prepare, are less expensive than the other materials, and have environmentally friendly characteristics. However, manganese-based materials have relatively low specific capacity. Nevertheless, because of the advantages of manganese-based materials as above, this positive active material is most likely to be used in batteries for electric vehicles and other large-scale systems.

For the manganese-based positive active materials, $LiMnO_2$ has higher specific capacity and better capability to retain its capacity at elevated temperatures, e.g. 50 to 60° C., than $LiMn_2O_4$. However, $LiMnO_2$ has an extremely low initial capacity of about 30–40 mAh/g, even though its capacity increases to 140 mAh/g (0.2C=0.4 mA/cm²) in about 20 charge-discharge cycles. In addition, it also has disadvantages of multiple plateaus during charge and discharge. Thus, its voltage abruptly decreases through multi-step discharges. Consequently, an electronic circuitry to accommodate this multi-step discharge, is needed at additional cost.

In an attempt to remedy such problems, research is being conducted on $Li_2Mn_{2-a}Cr_aO_4$. This material has an initial capacity of 100–120 mAh/g and does not experience an abrupt reduction in capacity on cycling. However, $Li_2Mn_{2-a}Cr_aO_4$ has a lower capacity retention capability upon charge-discharge cycling at high temperatures than $LiMnO_2$ (J. Electrochem. Soc. 145(3), 851, 1998).

SUMMARY OF THE INVENTION

It is an object of the present invention to provide a positive active material for a rechargeable lithium battery having a good capacity retention capability.

It is another object of the present invention to provide a positive active material for a rechargeable lithium battery having an improved initial capacity.

It is still another object of the present invention to provide a method of preparing a positive active material for a rechargeable lithium battery in which the positive active material has the above characteristics.

These and other objects may be achieved by a positive active material for a rechargeable lithium battery comprising a composite metal oxide represented by the formula 1 or a mixture thereof:

$$Li_xMn_{2-a-b}Cr_aM_bO_{4+z} \qquad \text{[formula 1]}$$

where x≧2; 0.25<a<2; 0<b≦0.3; z≧0; M is an alkali earth metal, a transition metal or a mixture thereof.

To achieve the above objects, the present invention provides a method of preparing a positive active material for a rechargeable lithium battery comprising a composite metal oxide represented by the formula 1 or a mixture thereof. In this method, a chromium salt, a manganese salt, and a metal salt(s) are dissolved in a solvent to produce a solution and the obtained solution is heated at 400 to 500° C. for a first heat-treatment step to produce a chromium manganese metal oxide. Thereafter, the chromium manganese metal oxide is mixed with a lithium salt and the mixture is heated at 600 to 800° C. for a second heat-treatment step.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE INVENTION

Figure 1A:
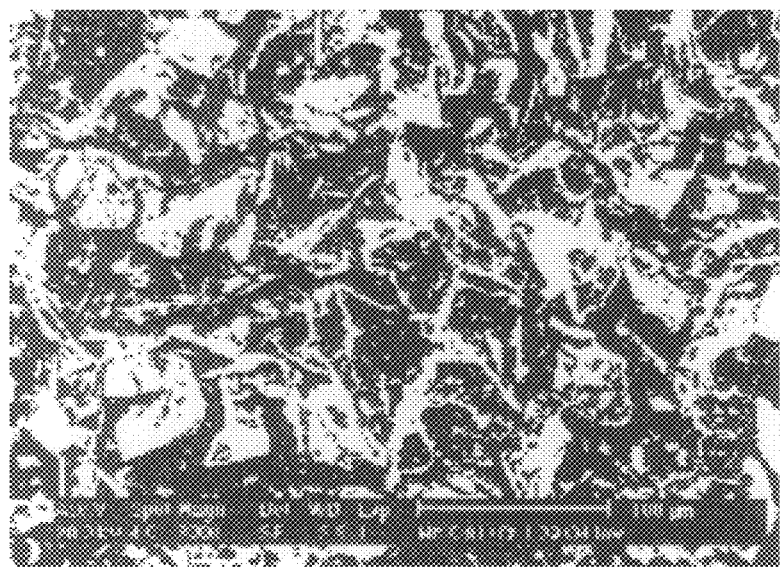
FIG. 1a is a SEM photograph of a positive active material obtained after the first heat-treatment step according to the Example 9 of the present invention.

The present invention provides a positive active material for a rechargeable lithium battery comprising a composite metal oxide represented by the formula 1 in which a portion of Mn in $Li_xMn_{2-a}Cr_aO_4$ is substituted by M. By substituting a portion of Mn with M in $Li_xMn_{2-a}Cr_aO_4$ to form $Li_xMn_{2-a-b}Cr_aM_bO_{4+z}$, the good initial capacity characteristics of $Li_xMn_{2-a}Cr_aO_4$ are maintained without significant change, and a good capacity retention capability at both high and room temperatures is realized.

$$Li_xMn_{2-a-b}Cr_aM_bO_{4+z} \qquad \text{[formula 1]}$$

where $x \geq 2$; $0.25 < a < 2$; $0 < b \leq 0.3$; $z \geq 0$; M is an alkali earth metal, a transition metal or a mixture thereof, and preferably $0.5 < a < 1.5$. When a is within the range of $0.5 < a < 1.5$, the final active material has a more structure such as that of an α-$NaFeO_2$, particularly a hexagonal structure. $LiMn_2O_4$, which is often used conventionally as a manganese-based active material has a cubic type spinel structure, whereas $LiMnO_2$ has a monoclinic structure. In contrast, the positive active material of the present invention has an α-$NaFeO_2$ structure, particularly a hexagonal structure, giving an improved specific capacity.

The positive active material of the present invention has an average particle size of 1 to 50 microns and a tap density of 0.2 to 3 g/cc. In the case where the average particle size and tap density fall outside these ranges, the energy density of a positive electrode may be reduced, since amounts of a conductive material and a binder may need to be increased to prepare an effective slurry.

To prepare the positive active material of the present invention, a chromium salt, a manganese salt, and a metal salt(s) are dissolved in a predetermined ratio in a solvent to make a solution. Manganese acetate or manganese dioxide may be used for the manganese salt, and for the solvent, water or alcohol, preferably methanol may be used. For the metal salt, one or more of an oxide, nitrate, carbonate, or hydroxide of the corresponding metal, for examples cobalt acetate, nickel acetate, magnesium acetate, and strontium acetate may be used.

The solution prepared as described above is heat-treated at 400 to 500° C. for 1 to 4 hours for a first heat-treatment step. In this step, the chromium salt, manganese salt, and metal salt(s) are decomposed and then combined to form $Mn_{2-a-b}Cr_aM_bO_{4+z}$. Preferably, the solution is preheat-treated at 150 to 300° C. prior to the first heat-treatment step to remove the solvent.

Subsequently, the resultant $Mn_{2-a-b}Cr_aM_bO_{4+z}$ and a lithium salt are mixed in a predetermined ratio, then heat-treated at 600 to 800° C. for a maximum of 12 hours for a second heat-treatment step, thereby completing the preparation of the $Li_xMn_{2-a-b}Cr_aM_bO_{4+z}$ positive active material. It is preferable that the duration of the second heat-treatment step is between 3 and 12 hours. If the upper limit of 12 hours is exceeded, the active material becomes gradually to an orthorhombic structure with reduced specific capacity. For the lithium salt described above, lithium carbonate, lithium nitrate, and lithium hydroxide may be used.

The types of the metal salts mentioned above are merely examples of the salts which can be used for preparation of the material of the present invention. The present invention is not limited to the use of the metal salts as described above.

A conventional method for preparation of the positive electrode of a rechargeable lithium battery using the active material of the present invention is as follows:

The active material of the present invention, a binder such as polyvinylfluoride, and a conductive material such as carbon black are mixed. The resulting mixture is added to an organic solvent such as N-methyl pyrrolidone to produce a viscous slurry. Using a doctor-blade, the slurry is coated on a current collector made of aluminum foil. The aluminum foil coated with the active material is then dried at approximately 150° C. to remove the solvent, thereby completing a positive electrode.

Using the prepared positive electrode, a rechargeable lithium battery is fabricated using a conventional method. A carbon-based material is used as an active material for a negative electrode; and a lithium salt such as $LiPF_6$, $LiAsF_5$, $LiCF_3SO_3$, $LiN(CF_3SO_2)_3$, $LiBF_6$, or $LiClO_4$ is used for the electrolyte salt.

The following examples further illustrate the present invention.

EXAMPLE 1

Mn acetate, Cr acetate, and Mg acetate were weighed in a 0.89:1.09:0.02 mole ratio, then dissolved in methanol in a 50 ml beaker. The resulting solution was heat-treated at 190° C. for 2 hours for the preheat-treatment step. The resulting residue was heat-treated at 450° C. for 2 hours for the first heat-treatment step, thereby producing $Mn_{0.89}Cr_{1.09}Mg_{0.02}O_4$. Then, LiOH and $Mn_{0.89}Cr_{1.09}Mg_{0.02}O_4$ were mixed in a 3.1:1 mole ratio in a mortar. The resulting mixture was heat-treated at 700° C. for 3 hours for a second heat-treatment step followed by cooling in the furnace to complete the preparation of a $Li_{3.1}Mn_{0.89}Cr_{1.09}Mg_{0.02}O_4$ positive active material for a rechargeable lithium battery.

EXAMPLE 2

A $Li_{3.1}Mn_{0.87}Cr_{1.09}Mg_{0.04}O_4$ positive active material for a rechargeable lithium battery was prepared by the same procedure as described in Example 1 except that the mole ratio of Mn acetate, Cr acetate, and Mg acetate was 0.87:1.09:0.04, and the preheat-treatment step was carried out at 200° C. for 4 hours to produce $Mn_{0.87}Cr_{1.09}Mg_{0.04}O_4$.

EXAMPLE 3

A $Li_{3.1}Sr_{0.06}Mn_{0.85}Cr_{1.09}O_4$ positive active material for a rechargeable lithium battery was prepared by the same procedure as described in Example 1 except that the mole ratio of Sr acetate, Mn acetate, and Cr acetate was 0.06:0.85:1.09, the preheat-treatment step was carried out at 200° C. for 4 hours, and the first treatment step was carried out at 450° C. for 4 hours to produce $Sr_{0.06}Mn_{0.85}Cr_{1.09}O_4$.

EXAMPLE 4

A $Li_{3.1}Sr_{0.04}Mn_{0.87}Cr_{1.09}O_4$ positive active material for a rechargeable lithium battery was prepared by the same procedure as described in Example 1 except that the mole ratio of Sr acetate, Mn acetate, and Cr acetate was 0.04:0.87:1.09, and the preheat-treatment step was carried out at 200° C. for 4 hours, and the first treatment step was carried out at 450° C. for 4 hours to produce $Sr_{0.04}Mn_{0.87}Cr_{1.09}O_4$.

Results of an XRD analysis performed on the materials synthesized in Examples 1–4 showed that the materials had a hexagonal structure.

Comparative Example 1

Mn acetate and Cr acetate were weighed in a 0.91:1.09 mole ratio, and then dissolved in methanol in a 50 ml beaker. The resulting solution was heat-treated at 200° C. for 1 hour for the preheat-treatment step. Then, the resulting residue was heat-treated at 450° C. for 2 hours for the first heat-treatment step, thereby producing $Mn_{0.91}Cr_{1.09}O_4$. Then, LiOH and $Mn_{0.91}Cr_{1.09}O_4$ were mixed in a 3.1:1 mole ratio in a mortar. The resulting mixture was heat-treated at 700° C. for 3 hours for the second heat-treatment step followed by cooling in the furnace to complete the preparation of a $Li_{3.1}Mn_{0.91}Cr_{1.09}O_4$ positive active material for a rechargeable lithium battery.

Individual positive active materials of Examples 1–4 and Comparative Example 1, respectively, were mixed with polyvinylidene fluoride and carbon black in a weight ratio of 92:4:4 in order to prepare a slurry. A predetermined amount of N-methyl pyrrolidone was then added to the mixture. The resulting material was mixed further until a uniform paste was formed. Using a doctor-blade, the paste was coated on an aluminum foil for a thickness of 300 microns. The aluminum foil coated with the active material was heat-treated at 150° C. until the N-methyl pyrrolidone was completely removed. The foil was then compressed at a predetermined pressure.

Subsequently, the compressed aluminum foil was cut into a circular shape and then welded onto a coin cell can. Lithium foil was cut in the same shape and size as the aluminum foil, and then attached to a nickel foil. A microporous polypropylene membrane (available from Cellgard company) was used as a separator, and the electrolyte of ethylene carbonate/dimethyl carbonate and $LiPF_6$ was used.

The resultant cells were charged and discharged at room temperature. Initial specific capacities were found to be as follows: 200 mAh/g for Example 1; 190 mAh/g for Example 2; 195 mAh/g for Example 3; 184 mAh/g for Example 4; and 210 mAh/g for Comparative Example 1. Then, the cells were cycled for 20 times at 50° C. at 1C (180 mA/g), followed by measurement of their capacity retentions. The results are shown in Table 1 below.

TABLE 1

| Examples | Capacity retentions after 20 charge-discharge cycles |
|---|---|
| Example 1 | 80% |
| Example 2 | 84% |
| Example 3 | 83% |
| Example 4 | 84% |
| Comparative Example 1 | 75% |

As shown in Table 1, the capacity retentions of the cells of Examples 1–4 after 20 charge and discharge cycles at 50° C. were superior to the capacity retention of the cell for Comparative Example 1. Although the initial capacities at room temperature of the cells for Examples 1–4 were slightly lower than the initial capacity of the cell for Comparative Example 1, the cells of Examples 1–4 displayed substantial improvements in their capacity retentions at 50° C. over the Comparative Example 1. Accordingly, the cells for Examples 1–4 have significantly better cycle life characteristics than the cell for the Comparative Example 1.

EXAMPLE 5

A $Li_{3.1}Co_{0.02}Mn_{0.89}Cr_{1.09}O_4$ positive active material for a rechargeable lithium battery was prepared by the same procedure as described in Example 1 except that the mole ratio of Co acetate, Mn acetate, and Cr acetate was 0.02:0.89:1.09, the resulting mixture was heat-treated at 190° C. for 2 hours for the preheat-treatment step, and the mixture was heat-treated at 450° C. for 2 hours for the first heat-treatment step, thereby producing $Co_{0.02}Mn_{0.89}Cr_{1.09}O_4$.

EXAMPLE 6

A $Li_{3.1}Co_{0.04}Mn_{0.87}Cr_{1.09}O_4$ positive active material for a rechargeable lithium battery was prepared by the same procedure as described in Example 1 except that the mole ratio of Co acetate, Mn acetate, and Cr acetate was 0.04:0.87:1.09, and the resulting mixture was heat-treated at 200° C. for 4 hours for the preheat-treatment step, thereby producing $Co_{0.04}Mn_{0.87}Cr_{1.09}O_4$.

EXAMPLE 7

A $Li_{3.1}Co_{0.06}Mn_{0.85}Cr_{1.09}O_4$ positive active material for a rechargeable lithium battery was prepared by the same procedure as described in Example 1 except that the mole ratio of Co acetate, Mn acetate, and Cr acetate was mixed in a 0.06:0.85:1.09, and the resulting mixture was heat-treated at 200° C. for 4 hours for the preheat-treatment step, thereby producing $Co_{0.06}Mn_{0.85}Cr_{1.09}O_4$.

EXAMPLE 8

A $Li_{3.1}Ni_{0.04}Mn_{0.87}Cr_{1.09}O_4$ positive active material for a rechargeable lithium battery was prepared by the same procedure as described in Example 1 except that the mole ratio of Ni acetate, Mn acetate, and Cr acetate was 0.04:0.87:1.09, the resulting mixture was heat-treated at 200° C. for 4 hours for the preheat-treatment step, and the mixture was heat-treated at 450° C. for 2 hours for the first heat-treatment step, thereby producing $Ni_{0.04}Mn_{0.87}Cr_{1.09}O_4$.

Individual positive active materials of Examples 5–8 were mixed with polyvinylidene fluoride and carbon black in a weight ratio of 92:4:4 in order to prepare a slurry. A predetermined amount of N-methyl pyrrolidone was then added to the mixture. The resulting material was mixed further until a uniform paste was formed. Using a doctor-blade, the paste was coated on an aluminum foil for a thickness of 300 microns. The aluminum foil coated with the active material was heat-treated at 150° C. until the N-methyl pyrrolidone was completely removed. The foil was then compressed at a predetermined pressure.

Subsequently, the compressed aluminum foil was cut into a circular shape and then welded onto a coin cell can. Lithium foil was cut in the same shape and size as the aluminum foil, and then attached to a nickel foil. A microporous polypropylene membrane (available from Cellgard company) was used as a separator, and the electrolyte of ethylene carbonate/dimethyl carbonate and $LiPF_6$ was used.

The resultant cells of Examples 5–8 were charged and discharged at room temperature. Initial specific capacities were found to be as follows: 205 mAh/g for Example 5; 202 mAh/g for Example 6; 195 mAh/g for Example 7; and 180 mAh/g for Example 8. Then, the cells of Examples 5 and 7 and of the Comparative Example 1 were cycled for 20 times at room temperature at 1 C (180 mA/g), followed by measuring their capacity retentions. The results are shown in Table 2 below.

TABLE 2

|  | Capacity retentions after 20 charge-discharge cycles |
|---|---|
| Example 5 | 85% |
| Example 7 | 92% |
| Comparative Example 1 | 65% |

As shown in Table 2, the capacity retentions of the cells for Examples 5 and 7 after 20 charge and discharge cycles at room temperature were superior to the capacity retention of the cell for the Comparative Example 1. Although the initial capacities of the cells for the Examples 5 and 7 were slightly lower than the initial capacity of the cell for the Comparative Example 1, the cells for Examples 5 and 7 displayed substantial improvements in their capacity retentions at room temperature over the Comparative Example 1. Accordingly, the cells of Examples 5 and 7 have significantly better cycle life characteristics than the cell for the Comparative Example 1.

EXAMPLE 9

Mn acetate, Cr acetate, and Co acetate were weighed in a 0.89:1.09:0.02 mole ratio, then dissolved in methanol in a 50 ml beaker. The resulting solution was heat-treated at 190° C. for 2 hours for the preheat-treatment step. The resulting residue was heat-treated at 450° C. for 2 hours for the first heat-treatment step, thereby producing $Mn_{0.89}Cr_{1.09}Co_{0.02}O_4$. Then, $Mn_{0.89}Cr_{1.09}Co_{0.02}O_4$ and LiOH were mixed at a 1:2.7 mole ratio in a mortar. The resulting mixture was heat-treated at 700° C. for 3 hours for a second heat-treatment step followed by cooling in the furnace to complete the preparation of a $Li_{2.7}Mn_{0.89}Cr_{1.09}Co_{0.02}O_4$ positive active material for a rechargeable lithium battery.

Figure 1B:
FIG. 1b is a SEM photograph of a positive active material obtained after the second heat-treatment step according to the Example 9 of the present invention.

An SEM photograph of the $Mn_{0.89}Cr_{1.09}Mg_{0.02}O_4$ obtained after the first heat-treatment step is shown in FIG. 1a. An SEM photograph of the $Li_{2.7}Mn_{0.89}Cr_{1.09}Co_{0.02}O_4$ obtained after the second heat-treatment step is shown in FIG. 1b. As shown in the photographs, a surface of the material after the second heat-treatment step is smoother than the material after the first heat-treatment step.

EXAMPLE 10

Mn acetate, Cr acetate, and Co acetate were weighed in a 0.89:1.09:0.02 mole ratio, then dissolved in methanol in a 50 ml beaker. The resulting solution was heat-treated at 200° C. for 4 hours for the preheat-treatment step. The resulting residue was heat-treated at 450° C. for 2 hours for the first heat-treatment step, thereby producing $Mn_{0.89}Cr_{1.09}Co_{0.02}O_4$. $Mn_{0.89}Cr_{1.09}Co_{0.02}O_4$ and LiOH were mixed in a 1:2.9 mole ratio in a mortar. The resulting mixture was heat-treated at 700° C. for 3 hours for the second heat-treatment step followed by cooling in the furnace to complete the preparation of a $Li_{2.9}Mn_{0.89}Cr_{1.09}Co_{0.02}O_4$ positive active material for a rechargeable lithium battery.

EXAMPLE 11

Mn acetate, Cr acetate, and Co acetate were precisely weighed in a 0.89:1.09:0.02 mole ratio, then dissolved in methanol in a 50 ml beaker. The resulting solution was heat-treated at 200° C. for 4 hours for the preheat-treatment step. The resulting residue was heat-treated at 450° C. for 2 hours for the first heat-treatment step, thereby producing $Mn_{0.89}Cr_{1.09}Co_{0.02}O_4$. $Mn_{0.89}Cr_{1.09}Co_{0.02}O_4$ and LiOH were mixed in a 1:3.1 mole ratio in a mortar. The resulting mixture was heat-treated at 700° C. for 3 hours for the second heat-treatment step followed by cooling in the furnace to complete the preparation of a $Li_{3.1}Mn_{0.89}Cr_{1.09}Co_{0.02}O_4$ positive active material for a rechargeable lithium battery.

EXAMPLE 12

Mn acetate, Cr acetate, and Co acetate were weighed in a 0.89:1.09:0.02 mole ratio, then dissolved in methanol in a 50 ml beaker. The resulting solution was heat-treated at 200° C. for 4 hours for the preheat-treatment step. The resulting residue was heat-treated at 450° C. for 2 hours for the first heat-treatment step, thereby producing $Mn_{0.89}Cr_{1.09}Co_{0.02}O_4$ $Mn_{0.89}Cr_{1.09}Co_{0.02}O_4$ and LiOH were mixed in a 1:3.3 mole ratio in a mortar. The resulting mixture was heat-treated at 700° C. for 3 hours for the second heat-treatment step followed by cooling in the furnace to complete the preparation of a $Li_{3.3}Mn_{0.89}Cr_{1.09}Co_{0.02}O_4$ positive active material for a rechargeable lithium battery.

EXAMPLE 13

Mn acetate, Cr acetate, and Co acetate were weighed in a 1.09:0.87:0.04 mole ratio, then dissolved in methanol in a 50 ml beaker. The resulting solution was heat-treated at 200° C. for 4 hours for the preheat-treatment step. The resulting residue was heat-treated at 450° C. for 2 hours for the first heat-treatment step, thereby producing $Mn_{0.87}Cr_{1.09}Co_{0.04}O_4$. $Mn_{0.87}Cr_{1.09}Co_{0.02}O_4$ and LiOH were mixed in a 1:2 mole ratio in a mortar. The resulting mixture was heat-treated at 700° C. for 3 hours in a second heat-treatment step followed by cooling in the furnace to complete the preparation of a $Li_2Mn_{0.87}Cr_{1.09}Co_{0.04}O_4$ positive active material for a rechargeable lithium battery.

Individual positive active materials of Examples 9–13 were mixed with polyvinylidene fluoride and carbon black in a weight ratio of 92:4:4 in order to prepare a slurry. A predetermined amount of N-methyl pyrrolidone was then added to the mixture. The resulting material was mixed further until a uniform paste was formed. Using a doctor-blade, the paste was coated on an aluminum foil for a thickness of 300 microns. The aluminum foil coated with the active material was heat-treated at 150° C. until the N-methyl pyrrolidone was completely removed. The foil was then compressed at a predetermined pressure.

Subsequently, the compressed aluminum foil was cut into a circular shape and then welded onto a coin cell can.

Lithium foil was cut in the same shape and size as the aluminum foil, and then attached to a nickel foil of a cap. A microporous polypropylene membrane (available from Cellgard company) was used as a separator, and the electrolyte of ethylene carbonate/dimethyl carbonate and $LiPF_6$ was used.

The test cells of Examples 9–13 were charged and discharged at room temperature. Initial specific capacities were found to be as follows: 170 mAh/g for Example 9; 182 mAh/g for Example 10; 187 mAh/g for Example 11; 218 mAh/g for Example 12; and 180 mAh/g for Example 13.

Capacity retentions of the positive active materials of the present invention at both high temperatures (about 50° C.) and at room temperature were improved over the state-of-the-art material. Accordingly, cycle life characteristics are also improved for rechargeable lithium batteries with the positive active material of the present invention.

The present invention has been described in detail herein above. It should be understood that many variations and/or modifications of the basic inventive concepts taught herein which may appear to those skilled in the present art will still fall within the spirit and scope of the present invention, as defined in the appended claims.

What is claimed is:

1. A positive active material for a rechargeable lithium battery comprising one or more composite metal oxides represented by formula 1:

$$Li_xMn_{2-a-b}Cr_aM_bO_{4+z} \tag{1}$$

where $x>2$; $0.25<a<2; 0<b\leq0.3; z\geq0$; and

M is selected from alkali earth metals, transition metals and mixtures thereof.

2. The positive active material of claim 1 wherein $0.5<a<1.5$.

3. The positive active material of claim 1 wherein the positive active material has an α-$NaFeO_2$ structure.

4. The positive active material of claim 1 wherein the positive active material has an average particle size of 1 to 50 microns and a tap density of 0.2 to 3 g/cc.

* * * * *